Nov. 8, 1932.  A. KÉGRESSE  1,886,693
MEANS FOR COUPLING TWO VEHICLES
Filed Oct. 11, 1930
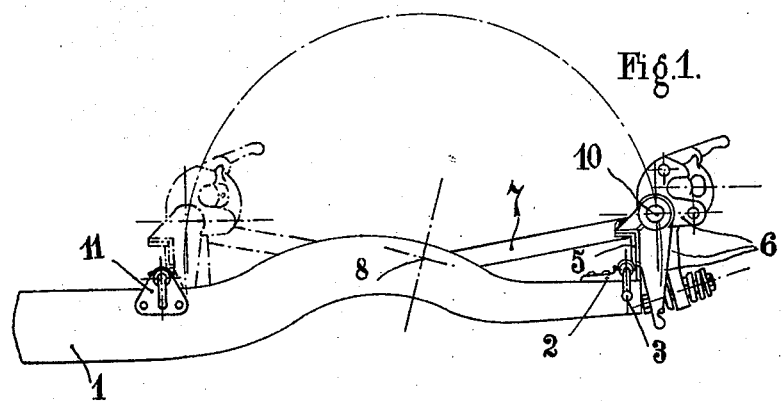
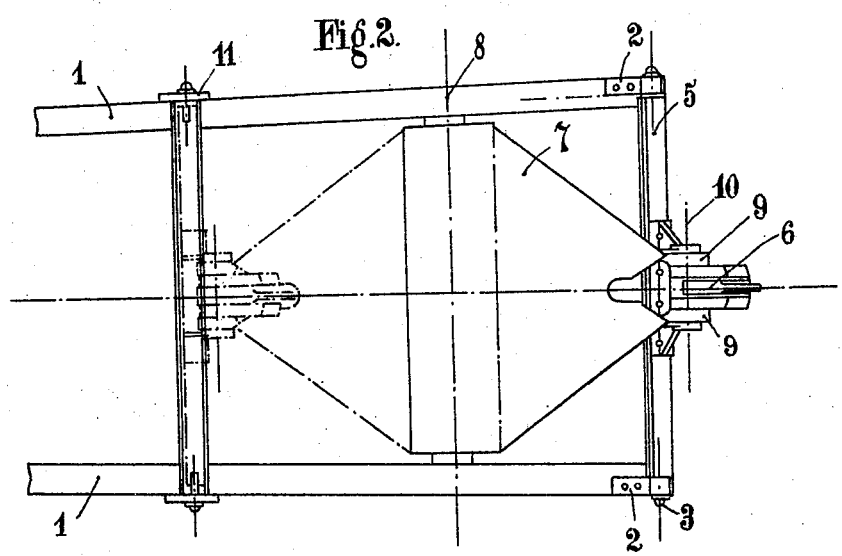
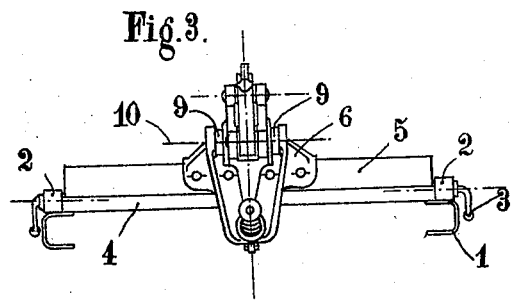
INVENTOR:
Adolphe Kégresse
BY
ATTORNEY Patented Nov. 8, 1932

1,886,693

UNITED STATES PATENT OFFICE

ADOLPHE KÉGRESSE, OF COURBEVOIE, FRANCE

MEANS FOR COUPLING TWO VEHICLES

Application filed October 11, 1930, Serial No. 488,106, and in France October 17, 1929.

The devices usually employed to couple automobile vehicles are arranged in two different ways, according to the following classification:

(1) those having the coupling hook placed at the back part of the vehicle;

(2) those having the coupling near the middle of the frame.

Each of these devices offers advantages and inconveniences.

The present invention refers to a variably positioned coupling-gear by which it is possible to couple a trailer or other vehicle, either at the back or at the middle of the frame, by displacing the coupling device.

On the annexed drawing:

Figure 1 represents, by way of example, a front elevation view of a complete device.

Figure 2 is a plan view.

Figure 3 is a rear elevation.

On all these figures the tractor frame is shown at 1. At the back of the latter, two holders 2 receiving a locking-device 3 are fixed on each of the beams 1.

Between the holders 2 is removably mounted a cross-bearer 4 (Fig. 3), the ends of which are locked on the frame by means of the locking-device 3.

The cross-bearer 4 supports a transverse member 5, carrying on an axis 10 the coupling-hook 6. A suitably formed rigid plate 7 pivoted to an axis 8 carries at its other end two carrying lugs 9, mounted on the same axis 10 as the hook 6.

On the frame-bearer 1, at another position, two holders 11 (Figs. 1 and 2) are fixed, carrying similar locking-device 3. The spacing between these two holders 11 is the same as that between holders 2.

The device operates as follows:

To pass from back coupling, as represented in Figs. 1 and 2, to central coupling, the lock 3 is loosened, thus liberating the whole of the coupling parts: coupling-hook 6, cross-bearer 4 and transverse support 5, which can be swung back, by swivelling of plate 7 round the axis 8. The hook 6 and its cross-bearer 4 effect a complete turn round the axis 10 and resume the vertical position they occupied at the back of the vehicle.

The locking-device of the holders 11 holds fixed the whole coupling device in the center of the frame.

It is seen that a single coupling-hook serves for two purposes on the same vehicle, allowing of a more rational use of the tractor, according to the work to be done.

I claim:

1. A device for coupling two vehicles, comprising a support pivoted on a horizontal axis on the frame of one of the vehicles, a coupling mechanism mounted on the swinging end of the support, and means for locking the support onto the frame in either one of two operative positions on opposite sides of the horizontal axis.

2. A device as set forth in claim 1, wherein the support comprises a plate pivoted to the vehicle frame intermediate the two operative positions of the coupling mechanism.

3. A device as set forth in claim 1, wherein the locking means comprises two clamps at each operative position of the coupling mechanism.

In testimony whereof I affix my signature.

ADOLPHE KÉGRESSE.